(12) United States Patent
Maier

(10) Patent No.: US 8,286,425 B2
(45) Date of Patent: Oct. 16, 2012

(54) ENERGY CONVERSION SYSTEM WITH DUPLEX RADIAL FLOW TURBINE

(75) Inventor: William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 75 days.

(21) Appl. No.: 12/909,936

(22) Filed: Oct. 22, 2010

(65) Prior Publication Data

US 2011/0252779 A1 Oct. 20, 2011

Related U.S. Application Data

(60) Provisional application No. 61/254,515, filed on Oct. 23, 2009.

(51) Int. Cl.
*F03B 13/12* (2006.01)

(52) U.S. Cl. ........ 60/398; 415/147; 415/149.1; 415/156

(58) Field of Classification Search ............ 60/398; 415/147, 149.1, 156, 162, 165
See application file for complete search history.

(56) References Cited

U.S. PATENT DOCUMENTS

| | | | | |
|---|---|---|---|---|
| 3,483,824 A | * | 12/1969 | Sprague | 415/147 |
| 4,300,869 A | | 11/1981 | Swearingen | |
| 4,313,711 A | | 2/1982 | Lee | |
| 4,441,316 A | * | 4/1984 | Moody | 60/398 |
| 4,533,292 A | | 8/1985 | Sugihara | |
| 4,579,506 A | | 4/1986 | Ossberger | |
| 4,789,300 A | | 12/1988 | Swearingen | |
| 4,858,434 A | * | 8/1989 | Masuda | 60/398 |
| 5,411,370 A | | 5/1995 | Varsik | |
| 5,472,314 A | | 12/1995 | Delonge | |
| 7,255,530 B2 | | 8/2007 | Vogiatzis | |
| 7,311,495 B2 | | 12/2007 | Ashley | |
| 7,390,163 B2 | | 6/2008 | Clauson | |
| 7,549,839 B2 | | 6/2009 | Carroll | |
| 7,553,127 B2 | | 6/2009 | Noelle | |
| 2005/0271508 A1 | | 12/2005 | Beyene | |
| 2006/0280605 A1 | | 12/2006 | Budi | |
| 2011/0252779 A1 | | 10/2011 | Maier | |

FOREIGN PATENT DOCUMENTS

| | | |
|---|---|---|
| WO | 9841758 A1 | 9/1998 |
| WO | 2004033900 A2 | 4/2004 |
| WO | 2008012530 | 1/2008 |
| WO | 2011050229 A2 | 4/2011 |

OTHER PUBLICATIONS

W. Maier, Dresser-Rand—"Wave Energy Conversion"—Jun. 5, 2009; 30 pages.

* cited by examiner

*Primary Examiner* — Daniel Lopez
(74) *Attorney, Agent, or Firm* — Edmonds & Nolte, PC

(57) ABSTRACT

An energy conversion system, including a wave chamber, and a turbine wheel coupled to a shaft and fluidly coupled with the wave chamber. The energy conversion system may also include a first radial flow passage fluidly coupled with the wave chamber and the turbine wheel, and first vanes disposed at least partially in the first radial flow passage, each of the first vanes being compliantly mounted and pivotal between first and second positions, the first vanes being configured to allow a motive fluid to flow in a first radial direction through the first radial flow passage when the first vanes are in the first position, and the first vanes being configured to substantially prevent the motive fluid from flowing through the first radial flow passage in a second radial direction when the second vanes are in the second position.

17 Claims, 13 Drawing Sheets

US 8,286,425 B2

ENERGY CONVERSION SYSTEM WITH DUPLEX RADIAL FLOW TURBINE

CROSS-REFERENCE TO RELATED APPLICATIONS

This application claims priority to U.S. Provisional Patent Application Ser. No. 61/254,515, which was filed on Oct. 23, 2009. This priority application is hereby incorporated by reference in its entirety into the present application, to the extent that it is not inconsistent with the present application.

BACKGROUND

This disclosure relates in general to energy conversion, and in particular to the conversion of energy such as, for example, ocean wave energy, into mechanical rotational shaft energy.

To convert ocean wave energy into mechanical rotational shaft energy, a wave chamber may be operably coupled to an air turbine having a shaft, with the wave chamber including an oscillating water column disposed therein. In response to the oscillation of the water column, air flows into and out of the wave chamber and thus the air turbine, causing the shaft of the air turbine to rotate. As a result, mechanical rotational shaft energy is extracted from the oscillating water column. However, in some cases, the cyclically reversing air flow to and from the wave chamber requires the use of conventional uni-directional turbines that are arranged to accept air flow in opposite directions, which use, in turn, requires the use of a complex network of one-way valving that may be prone to high maintenance costs and/or component failure. In other cases, the cyclically reversing air flow to and from the wave chamber requires the use of an air turbine configured to accept flow in two opposite directions, which use, in turn, results in turbine efficiency losses, system size increases, cost increases, and/or any combination thereof.

Therefore, what is needed is an energy conversion system or configuration that overcomes one or more of the problems described above.

SUMMARY

Embodiments of the disclosure may provide an energy conversion system. The energy conversion system may include a wave chamber, and a turbine wheel coupled to a shaft and fluidly coupled with the wave chamber. The energy conversion system may also include a first radial flow passage fluidly coupled with the wave chamber and the turbine wheel, and first vanes disposed at least partially in the first radial flow passage, each of the first vanes being compliantly mounted and pivotal between first and second positions, the first vanes being configured to allow a motive fluid to flow in a first radial direction through the first radial flow passage when the first vanes are in the first position, and the first vanes being configured to substantially prevent the motive fluid from flowing through the first radial flow passage in a second radial direction when the second vanes are in the second position.

Embodiments of the disclosure may also provide an energy conversion system including a wave chamber disposed at least at least partially in a body of water, and a radial flow turbine. The radial flow turbine may include first and second radial flow passages fluidly coupled with the wave chamber and a turbine wheel coupled to a shaft and positioned between the wave chamber and the first and second radial flow passages. The radial flow turbine may also include first vanes disposed at least partially in the first radial flow passage, the first vanes being configured to resiliently pivot to allow a motive fluid to enter the first radial flow passage in a first radial direction and to substantially prohibit the motive fluid from flowing out of the first radial flow passage in a second radial direction. The radial flow turbine may further include second vanes disposed at least partially in the second radial flow passage, the second vanes being configured to resiliently pivot open to allow the motive fluid to flow out of the second radial flow passage in the second radial direction and to pivot closed to substantially prohibit the motive fluid from flowing into the second radial flow passage in the first radial direction.

Embodiments of the disclosure may further provide a method for rotating a shaft. The method may include pivoting first vanes from a first position to a second position to open a first radial flow passage, the first vanes being compliantly mounted in the first radial flow passage, and drawing a motive fluid through the first radial passage in a first radial direction, past a turbine wheel coupled to the shaft, and into a wave chamber. The method may also include pivoting the first vanes from the second position to the first position to close the first radial flow passage, and pivoting second vanes from a first position to a second position to open a second radial flow passage, the second vanes being compliantly mounted in the second radial flow passage. The method may also include drawing the motive fluid to flow out of the wave chamber, past the turbine wheel, and through the second radial flow passage in a second radial direction.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
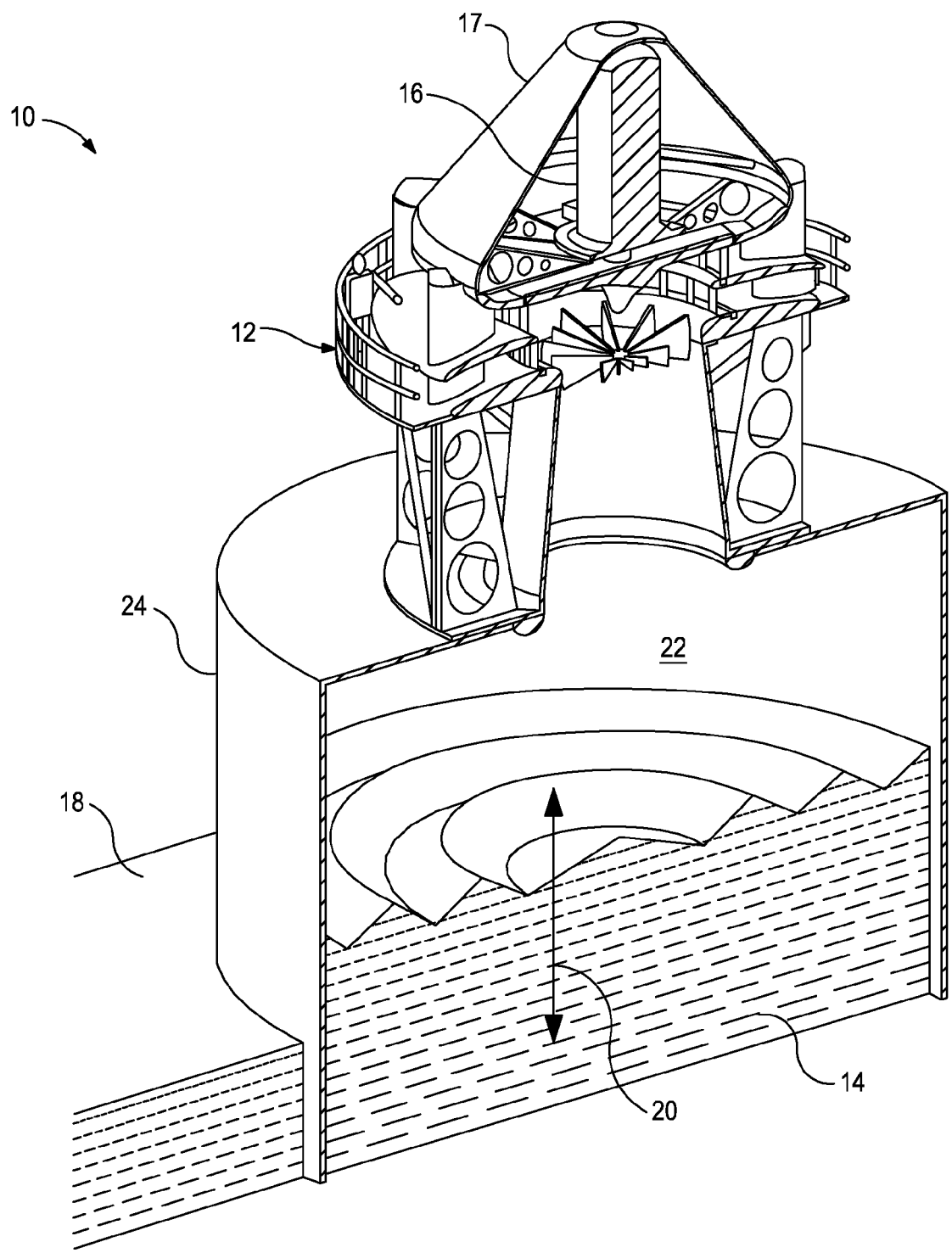
FIG. 1 is a perspective view of a section of an energy conversion system, according to an exemplary embodiment.

It is to be understood that the following disclosure describes several exemplary embodiments for implementing different features, structures, or functions of the invention.

Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates an energy conversion system 10, according to an exemplary embodiment. The energy conversion system 10 includes a radial flow turbine 12 and an oscillating water column 14 fluidically coupled thereto. A generator 16 is operably coupled to the radial flow turbine 12, and is enclosed within a shroud 17. A body of water 18, such as an ocean, is fluidically coupled to the oscillating water column 14. Waves in the body of water 18 cause the column 14 to oscillate vertically, as indicated by arrow 20. The column 14 oscillates within a wave chamber 22, which may be defined by a generally cylindrical structure 24. More particularly, the column 14 defines an upstroke when the column 14 is increasing in height and a downstroke when the column 14 is decreasing in height. It will be appreciated that during the upstroke, a motive fluid, such as air, is forced out of the wave chamber 22, and during the downstroke, the motive fluid is drawn into the wave chamber 22.

Figure 2:
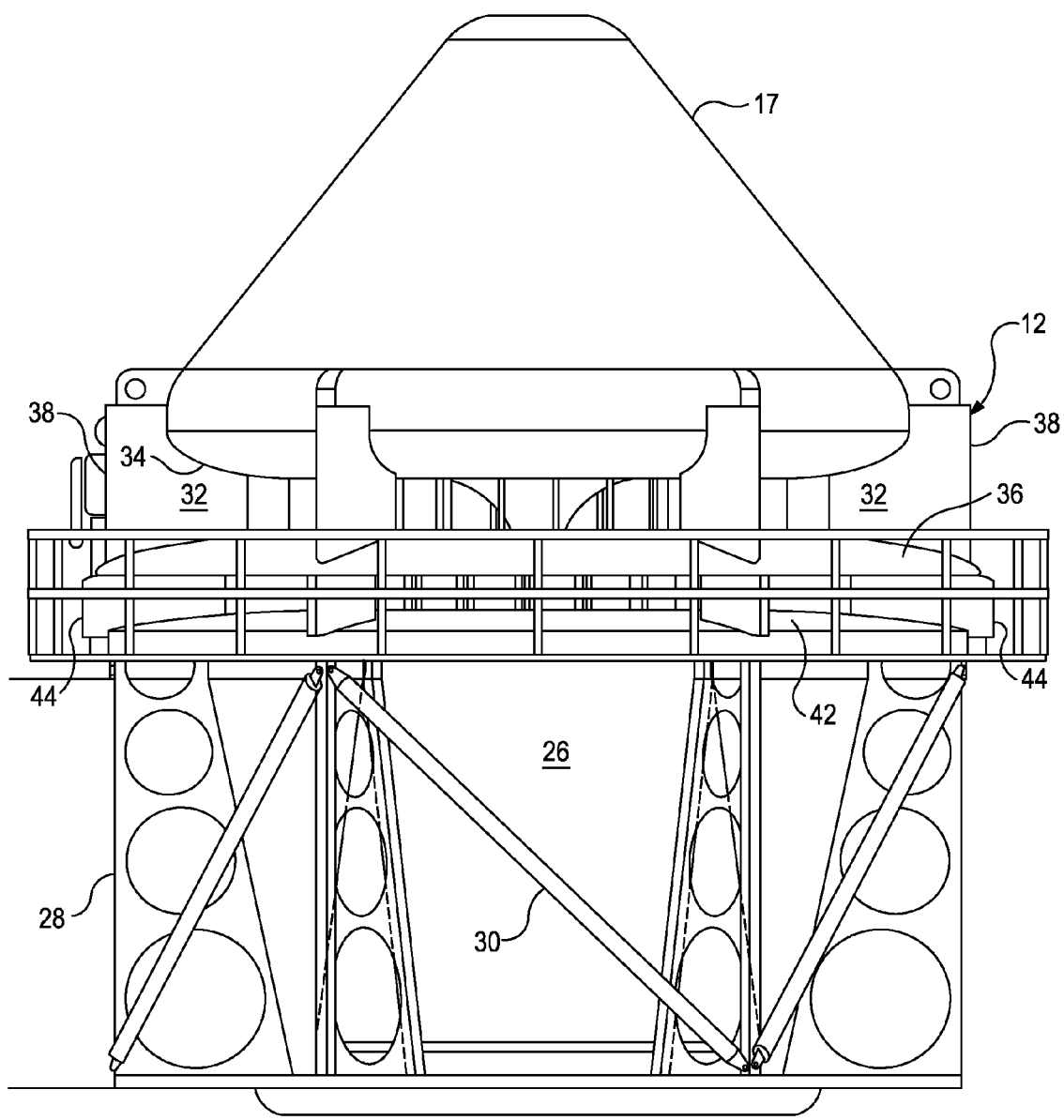
FIG. 2 is an elevational view of a radial flow turbine of the energy conversion system, according to an exemplary embodiment.
Figure 3:
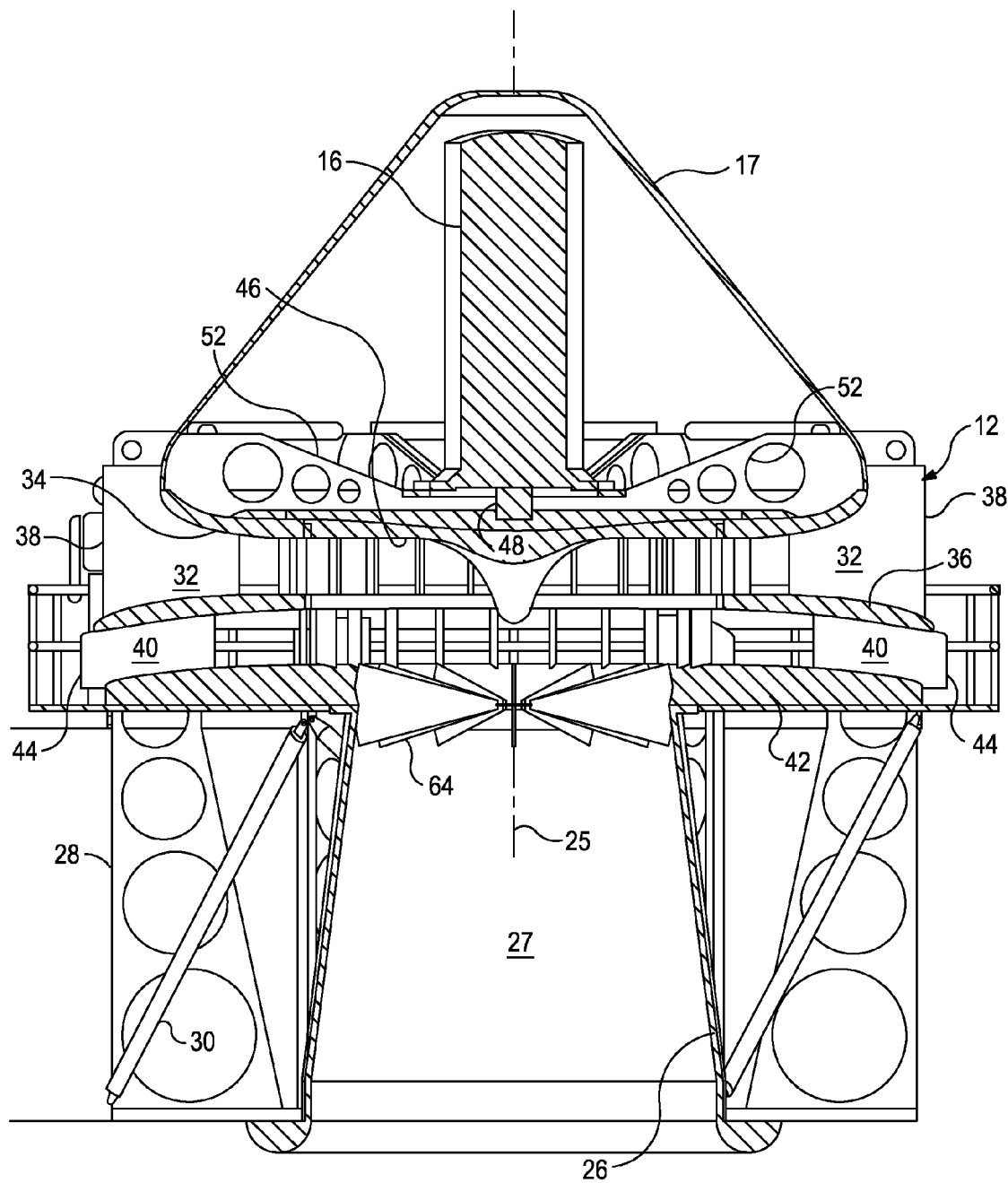
FIG. 3 is a sectional view of the radial flow turbine, according to an exemplary embodiment.

With continuing reference to FIG. 1, FIGS. 2-7 illustrate more detailed views of the radial flow turbine 12, according to an exemplary embodiment. Referring to FIGS. 2 and 3, there is illustrated an elevation and a cross-sectional view of the radial flow turbine 12, respectively. The radial flow turbine 12 may have a vertically-extending center axis 25 and may include a frustoconical structure 26 coupled to the cylindrical structure 24 (FIG. 1). The frustoconical structure 26 defines a flow region 27 that is fluidically coupled to the wave chamber 22 (FIG. 1). Pluralities of structural support members 28 and 30 are disposed around and support the frustoconical structure 26 and the remainder of the radial flow turbine 12. An inflow radial passage 32 is defined between an underside 34 of the shroud 17 and an upper side of an annular member 36. The inflow radial passage 32 extends circumferentially about the vertically-extending center axis 25. The annular member 36 is axially spaced from the underside 34 of the shroud 17. Streamlined fairings 38 cover the structural support members 28 and extend between the underside 34 of the shroud 17 and the annular member 36. The fairings 38 are circumferentially spaced about the vertically-extending center axis 25, thereby segmenting the inflow radial passage 32. An outflow radial passage 40 is defined between the lower side of the annular member 36 and an upper side of an annular base 42, which, in turn, is coupled to one or more of the frustoconical structure 26 and the support members 28 and 30. The outflow radial passage 40 extends circumferentially about the vertically-extending axis 25. The annular base 42 is axially spaced from the annular member 36. Streamlined fairings 44 cover the structural support members 28, and extend between the annular member 36 and the annular base 42, and are circumferentially spaced about the vertically-extending center axis 25, segmenting the outflow radial passage 40. Each of the passages 32 and 40 is fluidically coupled to the wave chamber 22.

Figure 4:
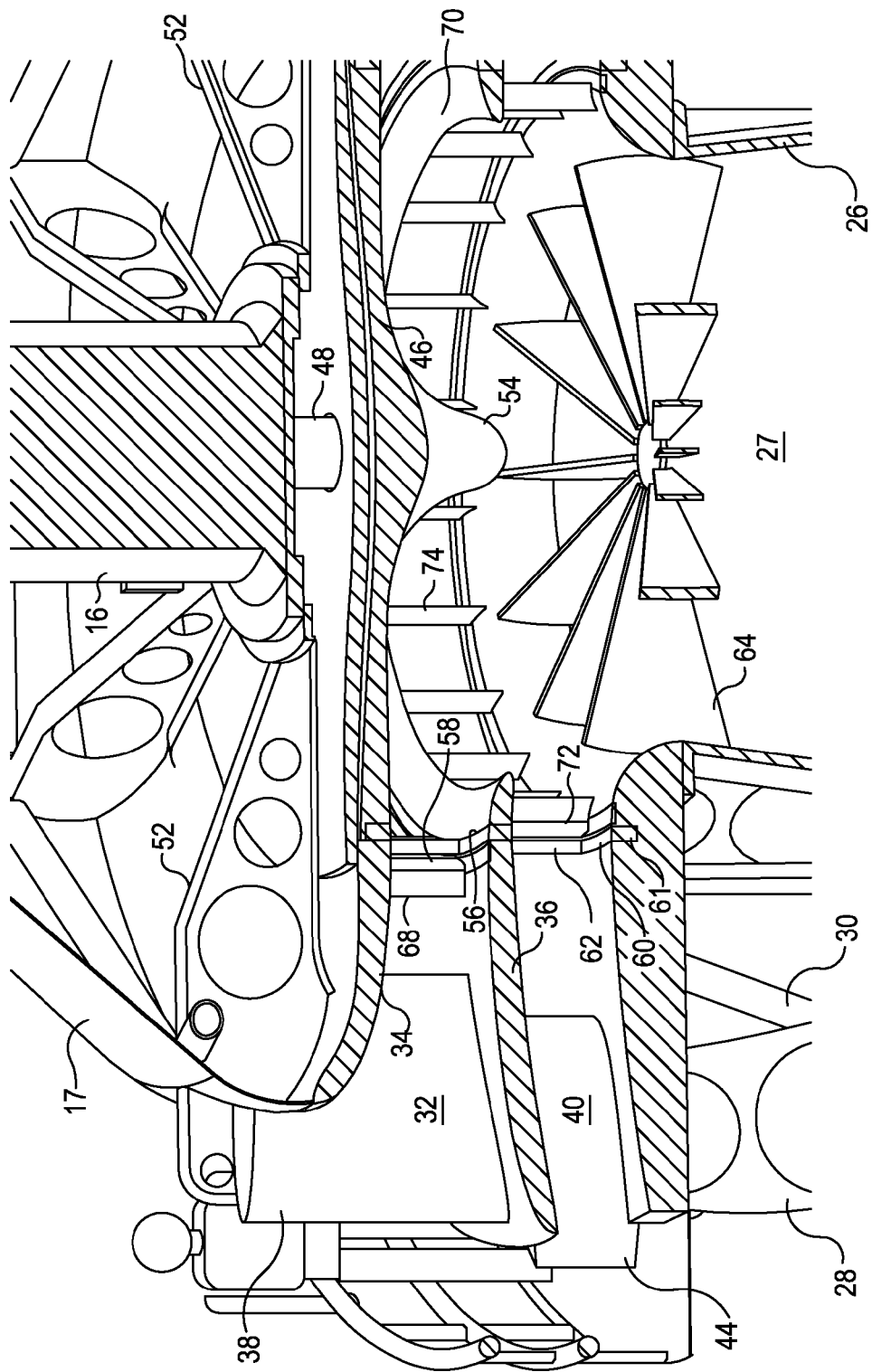
FIG. 4 is a partial perspective view of the radial flow turbine, according to an exemplary embodiment.
Figure 5:
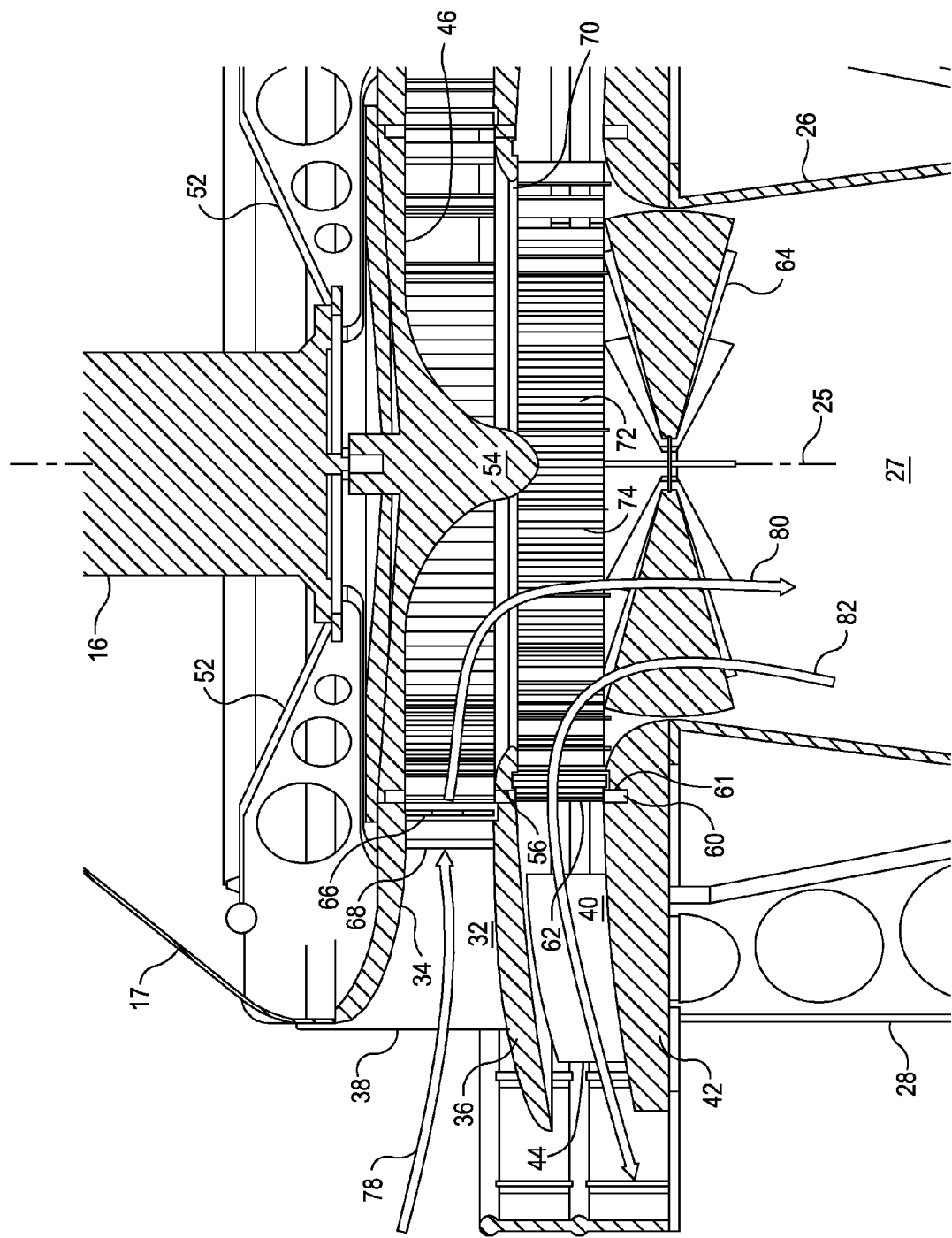
FIG. 5 is a partial sectional view the radial flow turbine, according to an exemplary embodiment.

Referring now additionally to FIGS. 4 and 5, there is shown a partial perspective view and a partial cross-sectional view, respectively, of the radial flow turbine 12. The turbine wheel 46 is operably coupled to the generator 16 via a shaft 48. The support members 28 extend axially upward past the passages 32 and 40 and then radially inward, thereby defining respective radially-extending portions 52 of the support members 28 that support one or more of the generator 16, the shaft 48 and the turbine wheel 46. A bulbous-shaped protrusion 54 extends downwardly from the turbine wheel 46. A ring 56 is axially spaced from and positioned below the turbine wheel 46. A plurality of radial inflow turbine buckets 58 is coupled to the turbine wheel 46 and the ring 56, extending axially from the turbine wheel 46 to the ring 56. The plurality of radial inflow turbine buckets 58 extends circumferentially about the vertically-extending center axis 25 and along the turbine wheel 46 and the ring 56. A ring 60 is axially spaced from and positioned below the ring 56. In an exemplary embodiment, the ring 60 extends within an annular channel 61 formed in the upper side of the annular base 42. A plurality of radial outflow turbine buckets 62 is coupled to the rings 56 and 60, extending axially from the ring 56 to the ring 60. The plurality of radial outflow turbine buckets 62 extends circumferentially about the vertically-extending center axis 25 and along the rings 56 and 60. A radial louver damper 64 is disposed within at least a portion of the end of the flow region 27 opposing the wave chamber 22. The annular base 42 extends circumferentially around the louver damper 64.

Figure 6:
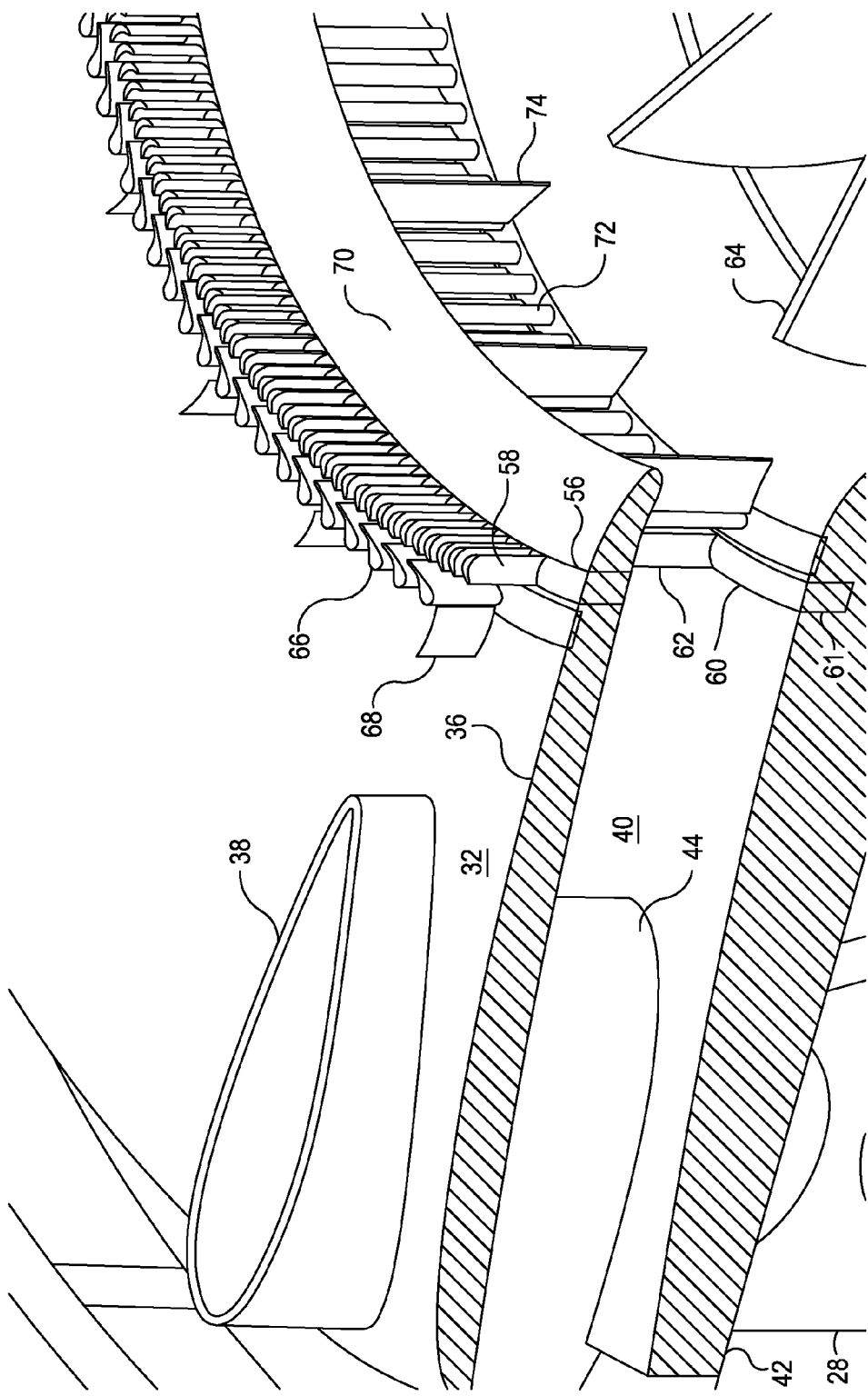
FIG. 6 is a partial perspective view of the radial flow turbine, according to an exemplary embodiment.
Figure 7:
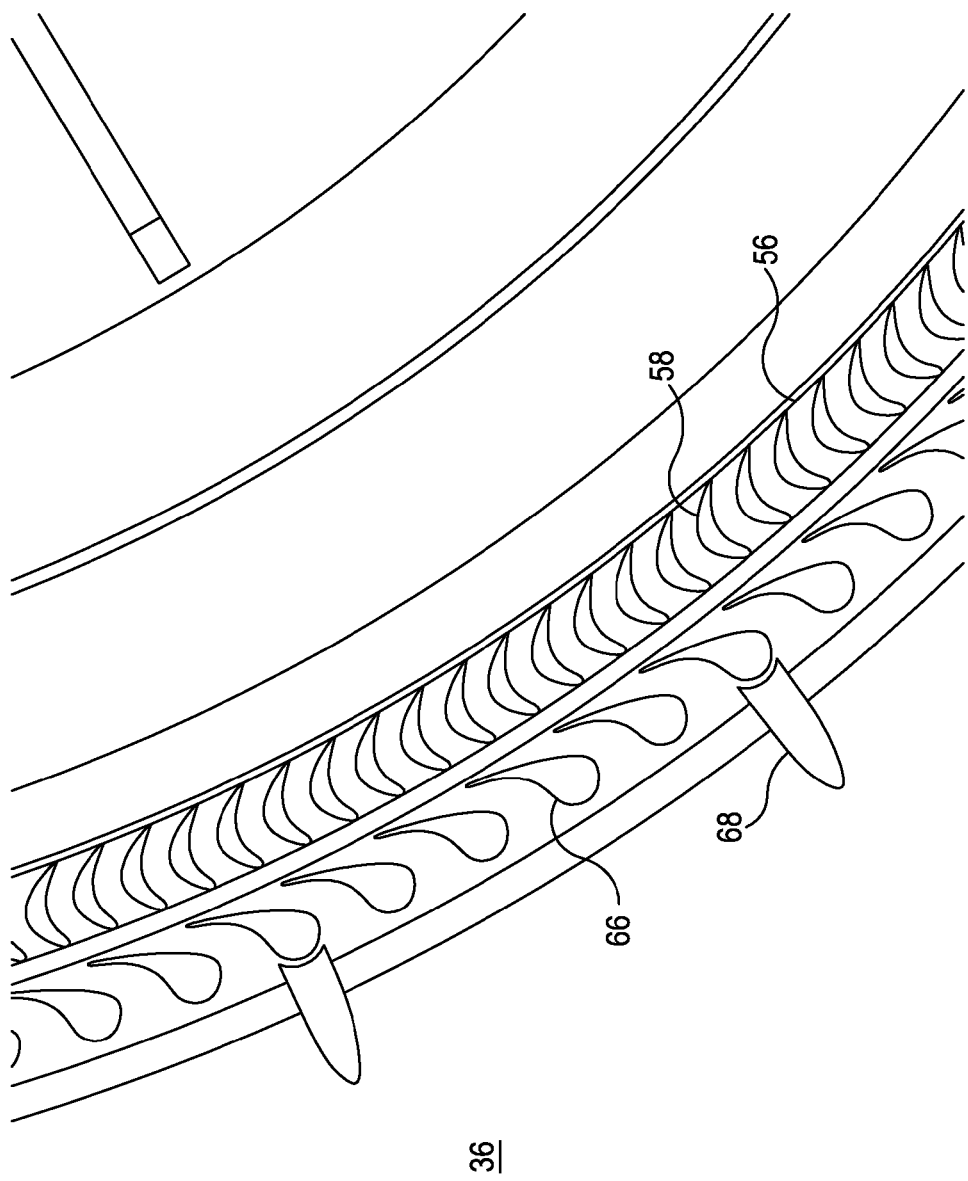
FIG. 7 is a partial plan view of the radial flow turbine, according to an exemplary embodiment.
Figure 7:
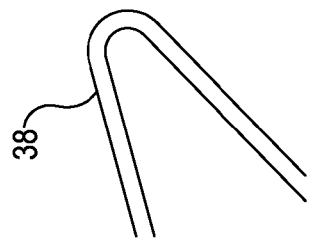

Referring additionally to FIGS. 6 and 7, there is shown a partial perspective view and a partial plan view, respectively, of the radial flow turbine 12, according to an exemplary embodiment. As shown, the buckets 58 and 62 may be two-dimensional prismatic sections, such as impulse turbine buckets. Moreover, the radial flow turbine 12 may include a plurality of radial inflow nozzle vanes 66 coupled to the underside 34 of the shroud 17 and the annular member 36 and extending axially from the underside 34 and to the annular member 36. The plurality of radial inflow nozzle vanes 66 extends circumferentially about the vertically-extending center axis 25 and along the underside 34 and the annular member 36. Each radial inflow nozzle vane 66 is compliantly mounted and thus pivotable about a vertical axis that is generally parallel to the vertically-extending center axis 25, as will be described in further detailed below. Streamlined structural ribs 68 extend between the underside 34 of the shroud 17 and the annular member 36, and are circumferentially spaced about the vertically-extending center axis 25. Each rib 68 is aligned circumferentially to one of the radial inflow nozzle vanes 66.

A ring 70 is axially spaced from and positioned above the annular base 42. A plurality of radial outflow nozzle vanes 72 is coupled to the ring 70 and the annular base 42, extending axially from the annular base 42 and to the ring 70. The plurality of radial outflow nozzle vanes 72 extends circumferentially about the vertically-extending center axis 25 and along the ring 70 and the annular base 42. Each radial outflow nozzle vane 72 is compliantly mounted and thus resiliently pivotable about a vertical axis that is generally parallel to the vertically-extending center axis 25, as will be described in further detailed below. Streamlined structural ribs 74 extend between the ring 70 and the annular base 42 and are circumferentially spaced about the vertically-extending center axis 25. Each rib 74 is aligned circumferentially to one of the radial outflow nozzle vanes 72. The structural ribs 68 and 74 rigidly align the inner and outer endwalls of the inflow and outflow flowpaths through the nozzle vanes 66 and 72 such that the pressure forces on the nozzle vanes 66 and 72 can be absorbed without significant radial or axial movement of the endwalls.

With continuing reference to FIGS. 1-7, FIGS. 8 and 9 illustrate enlarged views of the radial outflow nozzle vanes 72. Each radial outflow nozzle vane 72 is compliantly mounted and thus resiliently pivotable about a vertical axis that is generally parallel to the vertically-extending center axis 25. More particularly, each radial outflow nozzle vane 72 is rotatably mounted in each of the ring 70 and the annular base 42. Further, since the nozzle vanes 72 are compliantly mounted, the nozzle vanes 72 may be configured to be intrinsically loaded to be biased in a closed position, thereby permitting the airflow through the nozzle vanes 72 of the radial flow turbine 12 to be controlled with respect to, for example, the direction of the airflow, the minimum flow rate that the airflow must have to open the vanes 72 and thus flow through the vanes 72, and/or other parameters of the airflow through the nozzle vanes 72 of the radial flow turbine 12. The compliantly-mounted nozzle vanes 72, and the compliantly-mounted nozzle vanes 66 (described in further detailed below), facilitate the operation of a duplex flow device such as, for example, the radial flow turbine 12, as will be described in greater detailed below in connection with the operation of the radial flow turbine 12.

Figure 8:
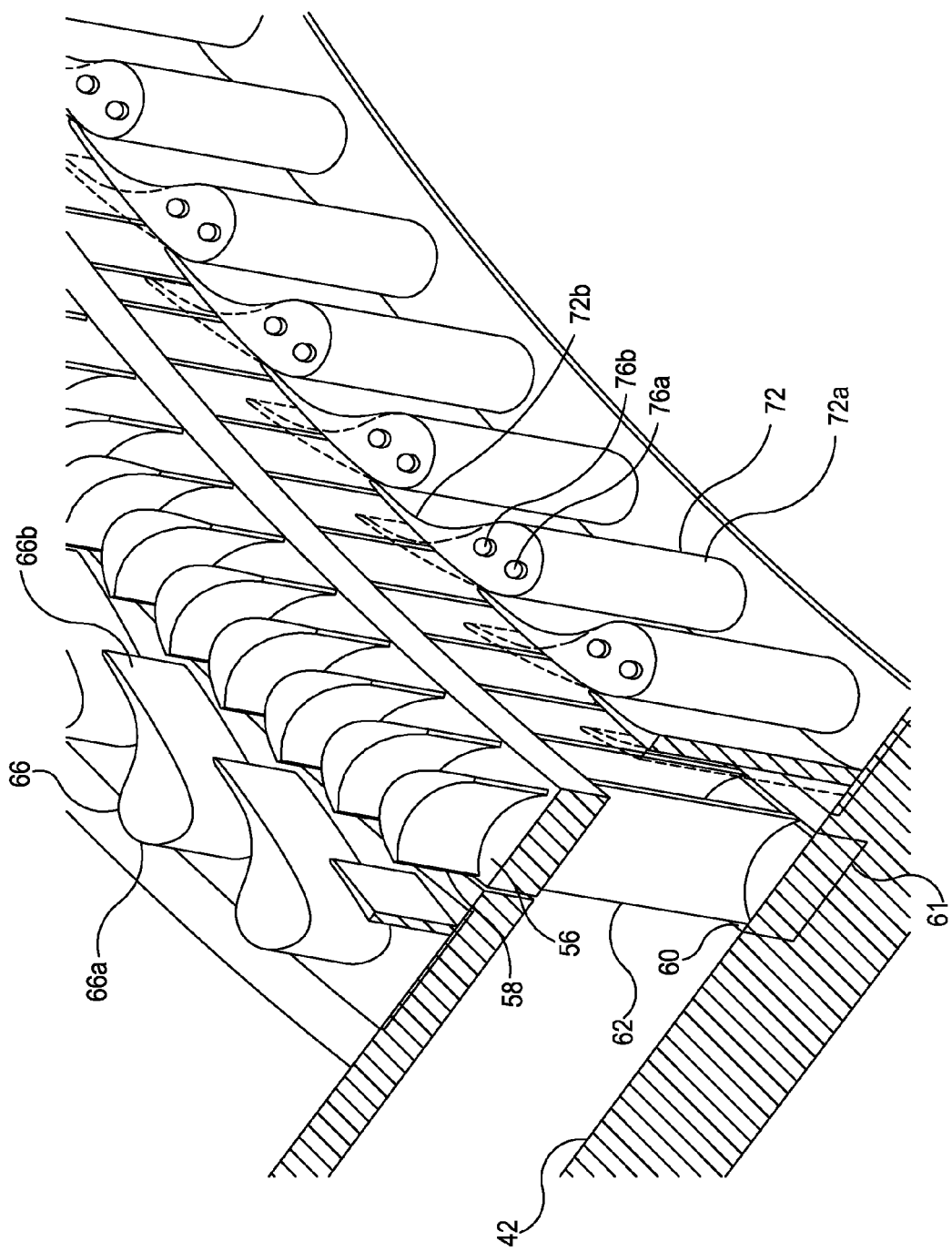
FIG. 8 is a partial perspective view of the radial flow turbine, according to an exemplary embodiment.
Figure 9:
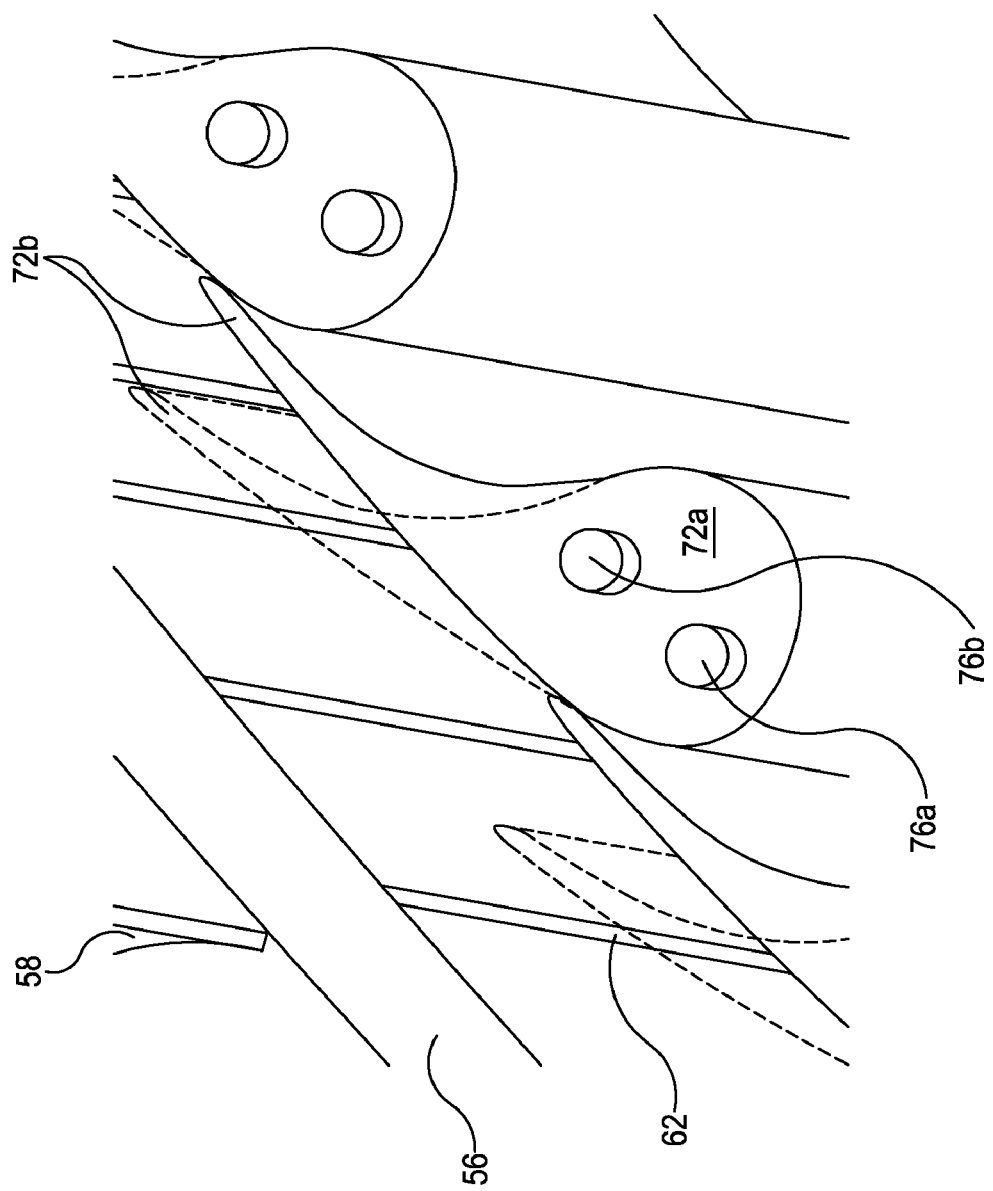
FIG. 9 is an enlarged view of a portion of FIG. 8.

The compliantly-mounted vanes 72 may take several different forms, or otherwise be configured, so long as the vanes 72 are rotatably mounted and are intrinsically loaded to be biased to a closed position. For example, as shown in FIGS. 8 and 9, each vane 72 is aerofoil shaped, including a head 72a, with a tapered tail 72b extending therefrom. Each vane 72 further includes a structure such as parallel-spaced pins 76a and 76b, which extend axially upwardly from the head 72a and are coupled to the ring 70, thereby generally fixing the position of the head 72a within the radial flow turbine 12. Further, pins that are substantially similar to the pins 76a and 76b extend axially downwardly from the head 72a and are coupled to the annular base 42. In an exemplary embodiment, instead of including the pins 76a and 76b and two additional pins substantially similar thereto, each vane 72 includes the pins 76a and 76b, which extend through the head 72a and are coupled to the ring 70 and the annular base 42.

At least the portion of the head 72a enclosing the pins 76a and 76b, and the downwardly extending pins that are similar to the pins 76a and 76b, is composed of low-modulus material such as, for example, rubber, one or more other types of elastomers, and/or any combination thereof. In conjunction with this low-modulus material, the respective locations of the pins 76a and 76b and the pins substantially similar thereto are such that normal flow induced pressure loading on each vane 72 is adapted to work against the stiffness of the low-modulus material and the pins enclosed thereby, thereby creating a net unbalanced moment that forces the radial outflow nozzle vane 72 to rotate or pivot about a vertical axis that is generally parallel to the vertically-extending center axis 25. The respective orientations of the pins 76a and 76b and the pins substantially similar thereto are such that, when no motive fluid pressure is applied, the radial outflow nozzle vane 72 is urged to rotate to a fully closed position, that is, the end portion of the tail 72b contacts the head 72a of the adjacent vane 72, as shown in FIGS. 8 and 9 (a fully open position is also shown in FIGS. 8 and 9, as indicated by the dashed lines). Thus, the vanes 72 are adapted to generally block any flow of motive fluid such as air therebetween in the inwardly radial direction, and to permit the air to flow therebetween in the opposite radial direction (radially outward). In an exemplary embodiment, the vanes 72 may be positioned relative to one another so that a preload is present to bias the vanes 72 against adjacent ones of the vanes 72, that is, to urge or force the vanes 72 to be closed when no fluid pressure is applied.

The low-modulus material enclosing the pins 76a and 76b may be corrosion resistant and thus particularly suitable for seawater environments, in which wave chambers, such as the wave chamber 22, are commonly located. Moreover, the low-modulus material enclosing the pins 76a and 76b protect the pins 76a and 76b from the environment surrounding the radial flow turbine 12. In several exemplary embodiments, the nozzle vanes 72 may be composed entirely of a low-modulus material such as, for example, rubber, one or more other types of elastomers, and/or any combination thereof.

In an exemplary embodiment, each radial inflow nozzle vane 66 is aerofoil shaped, having a head 66a with a tapered tail 66b extending therefrom. Further, each vane 66 is compliantly mounted and thus pivotable about a vertical axis that is generally parallel to the vertically-extending center axis 25 in a manner generally in accordance with the foregoing and shown in FIGS. 8 and 9, that is, with at least a portion of the head 66a of each radial inflow nozzle vane 66 being composed of a low-modulus material that encloses two pins that extend upwards and are coupled to the underside 34 and further encloses two pins that extend downwards and are coupled to the annular member 36. When no motive fluid is applied, the nozzle vane 66 is in a fully closed position having the tail 66b contacting the head 66a of the adjacent vane 66; thus, the vanes 66 are adapted to generally block any flow of motive fluid such as air therebetween in the outwardly radial direction, and to permit the air to flow therebetween in the opposite radial direction (radially inward).

In exemplary operation, with continuing reference to FIGS. 1-9, wave motion occurs in the body of water 18, thereby causing the water column 14 to oscillate, that is, rise and fall, within the wave chamber 22. When the water column 14 falls, a vacuum is formed within the wave chamber 22. As a result, motive fluid, which is air in this exemplary embodiment, is drawn into the radial flow turbine 12. More particularly, air is drawn into the inflow radial passage 32, flowing radially inwardly between the fairings 38 and through the inflow radial passage 32, as indicated by an arrow 78 in FIG. 5. In contrast, air does not flow through the outflow radial passage 40 because the radial outflow nozzle vanes 72 remain in the fully closed position shown in FIGS. 8 and 9, generally blocking air flow in the inwardly radial direction. Any pressure applied in an inwardly radial direction upstream of the vanes 72 further urges the tails 72b to pivot against the adjacent heads 72a, thereby further blocking off the radial outflow nozzle vanes 72.

As the air flows radially inwardly between the fairings 38 and through the inflow radial passage 32 in response to the fall of the oscillating water column 14 and the resulting vacuum created within the wave chamber 22, the air flow contacts the radial inflow nozzle vanes 66, causing the vanes 66 to pivot in a clockwise direction, as viewed in FIG. 7, from their fully closed position to an open position in which the respective tails 66b of the vanes 66 have moved away from the heads 66a of the corresponding adjacent vanes 66 that the tails 66b contact when the vanes 66 are in their fully closed position. As a result, air is permitted to flow between the vanes 66. By flowing between the radial inflow vanes 66, the air is directed to a desirable velocity $C_1$ and swirl angle $\alpha_1$, that is, the angle the fluid velocity makes with a tangent to a cylinder concentric with the vertically-extending center axis 25. The air continues to flow radially inwardly toward and then between the radial inflow turbine buckets 58, thereby causing the buckets 58 and thus the turbine wheel 46 to rotate about the vertically-extending center axis 25. In response to the rotation of the turbine wheel 46, the shaft 48 rotates, thereby supplying mechanical rotational shaft energy to the generator 16. The ring 56, the radial outflow turbine buckets 62 and the ring 60 rotate along with the buckets 58, the turbine wheel 46 and the shaft 48, with the non-active buckets 62 rotating in a quiescent zone of fluid. After exiting the radial inflow turbine buckets 58, the air continues to travel radially inward and then axially downward through the flow region 27, as indicated by an arrow 80 shown in FIG. 5. In an exemplary embodiment, axial-radial stationary vanes may be provided downstream of the buckets 58 to minimize the effect of any residual stage exit swirl velocity due to the general decrease in streamline radius. The air flows downward through the radial louver damper 64, which provides more radial-axial surfaces to further inhibit undesirable swirl velocities. The air continues to flow downward through the flow region 27, which functions as a conical diffuser to recover some of the inflow stage velocity loss. The air exits the flow region 27 and enters the wave chamber 22.

When the oscillating water column 14 rises, the air within the wave chamber 22 is compressed, causing the air to flow axially upwardly through the flow region 27. The air then turns radially outward and flows between the radial outflow nozzle vanes 72, between the radial outflow turbine buckets 62, through the outflow radial passage 40, and out of the radial flow turbine 12, as indicated by an arrow 82 in FIG. 5. In contrast, air does not flow between the radial inflow turbine buckets 58, between the radial inflow nozzle vanes 66, and through the inflow radial passage 32 because the radial inflow nozzle vanes 66 remain in the fully closed position, generally blocking air flow in the outwardly radial direction. Any pressure applied in an outward radial direction upstream of the vanes 66 further urges the tails 66b of the vanes 66 to pivot against the heads 66a of the adjacent vanes 66, thereby further blocking off the radial inflow nozzle vanes 66.

As the air flows radially outwardly between the ribs 74 in response to the rise of the oscillating water column 14 and the resulting pressure increase created within the wave chamber 22, the air flow contacts the radial outflow nozzle vanes 72, causing the vanes to pivot in a counterclockwise direction, as viewed in FIG. 8, from their fully closed position to an open position in which the respective tails 72b of the vanes 72 have moved away from the heads 72a of the corresponding adjacent vanes 72 that the tails 72b contact when the vanes 72 are in their fully closed position. As a result, air is permitted to flow between the vanes 72. In several exemplary embodiments, the vanes 72 pivot to a fully open position, that is, a position in which the respective tails 72b of the vanes 72 contact respective stop ribs (shown in and described below with reference to FIGS. 10 and 11) radially positioned between the vanes 72 and the buckets 62 and thus the vanes 72 are prevented from pivoting any further in a counterclockwise direction, as viewed in FIG. 8. These stop ribs are positioned circumferentially with respect to nozzle vanes 72 such that the center of pressure of the air flow over the nozzle vanes 72 goes through the stop ribs. After the vanes 72 make contact with the stop ribs, the air flow only applies a direct force against the stop rib and no longer imparts a moment or rotation torque about the pins 76a and 76b to the nozzle vanes 72.

The air continues to flow radially outward towards, and then between, the radial outflow turbine buckets 62, thereby causing the buckets 62 and thus the ring 60, the ring 56, the radial inflow turbine buckets 58 and the turbine wheel 46 to rotate about the vertically-extending center axis 25. The non-active buckets 58 rotate in a quiescent zone of fluid. In response to the rotation of the turbine wheel 46, the shaft 48 rotates, thereby supplying mechanical rotational shaft energy to the generator 16. The radial inflow nozzle vanes 66, the radial inflow turbine buckets 58, the radial outflow nozzle vanes 72 and the radial outflow turbine buckets 62 are configured so that the shaft 48 rotates in the same direction irrespective of the direction of motive fluid flow, that is, regardless of whether the oscillating water column 14 is rising or failing and thus whether air is flowing through the inflow radial passage 32 or the outflow radial passage 40.

After exiting the radial outflow turbine buckets 62, the air continues to travel radially outwardly through the outflow radial passage 40, as indicated by the arrow 82 in FIG. 5. Thus, air exits the radial flow turbine 12 via the outflow radial passage 40 in a radial direction that is opposite to the radial direction in which the air flows when entering the radial flow turbine 12 via the inflow radial passage 32. The outflow radial passage 40 is shaped to function as a radial diffuser to minimize exit velocity losses, and may be turned axially away from the inlet of the inflow radial passage 32 to allow optimal area distribution for both passages, as shown in FIG. 5.

During the operation of the energy conversion system 10, optimal flow performance is provided at least in part by the duplex flow configuration of the radial flow turbine 12, that is, the individual inflow and outflow turbine fluid passages (the inflow radial passage 32 and the outflow radial passage 40, respectively). Further, since the inflow radial passage 32 and the outflow radial passage 40 are largely fluidically de-coupled from one another (except for the shared connecting passage including the flow region 27 to the wave chamber 22), the vanes 66, the vanes 72, the buckets 58 and the buckets 62 can be individually optimized. Still further, the compliant mounting of each of the vanes 66 and 72 allows for passive flow re-direction without valves, dampers or active position sensors and controls, thereby achieving greater reliability, especially under harsh operating conditions associated with, for example, bodies of water such as oceans. The radial inflow of air into, and the radial outflow of air from, the radial flow turbine 12 allows for an axially compact design that can be readily overhung from the shaft 48. Yet still further, since air flows into and out of the radial flow turbine 12 radially and perpendicular to the center axis 25, access to the generator 16 and mechanical components such as bearings and/or seals is facilitated. Moreover, the radial flow turbine 12 provides a wider range of practical bucket hub to tip ratios, which facilitates the scaling of the radial flow turbine 12 to commercial sizes.

Figure 10:
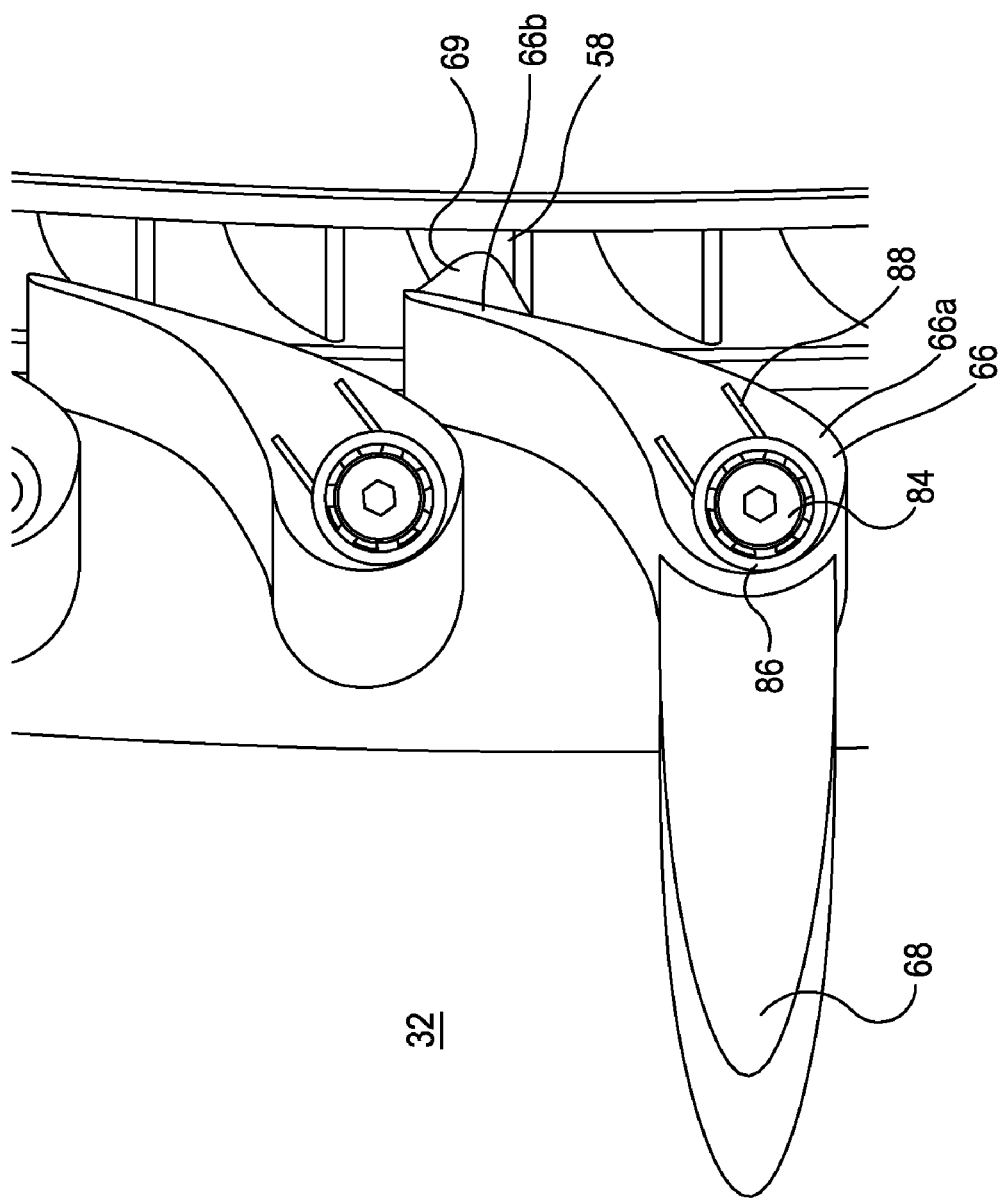
FIG. 10 is a partial perspective view of the radial flow turbine, according to an exemplary embodiment.
Figure 11:
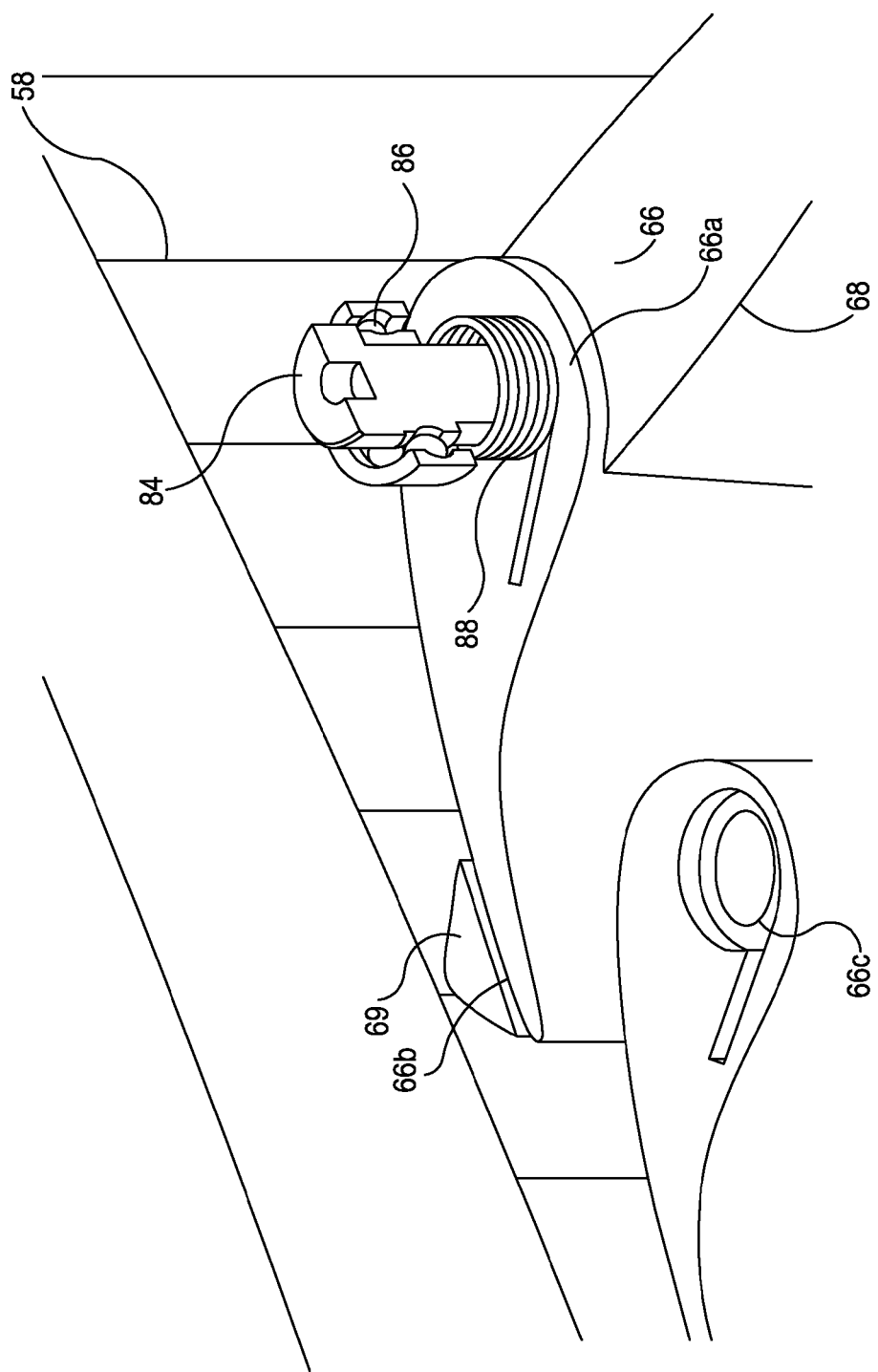
FIG. 11 is a partial perspective view of the radial flow turbine, according to an exemplary embodiment.

FIGS. 10 and 11, with continuing reference to FIGS. 1-9, illustrate another embodiment of compliantly mounting the plurality of radial inflow nozzle vanes 66. Instead of or in addition to the elastomeric mounting arrangement shown in FIGS. 8 and 9, the radial inflow nozzle vanes 66 may be mechanically mounted with a shoulder screw 84, a bearing assembly 86, and a biasing member such as a torsion spring 88. More particularly, each radial inflow nozzle vane 66 includes a bore 66c formed in each of the opposing axial end portions of the head 66a, with one end portion of the torsion spring 88 extending within the bore 66c formed in the upper axial end portion of the head 66a. FIG. 11 illustrates the bore 66c, showing one of the plurality of radial inflow nozzle vanes 66 without the shoulder screw 84 or bearing 86. It will be appreciated, however, that this omission is simply for illustrating the bore 66c.

The shoulder screw 84 extends downwardly through the bearing assembly 86 and the torsion spring 88, which is positioned axially below the bearing assembly 86, and further extends into the upper axial end portion of the head 66a. Likewise, a shoulder screw (not shown) similar to the shoulder screw 84 extends upwardly through a bearing assembly 86 similar to the bearing assembly 86 and a torsion spring similar to the torsion spring 88, and further extends into the lower axial end portion of the head 66a. In an exemplary embodiment, the bearing assembly 86 is or includes an anti-friction bearing, and/or a no-lube ball bearing. The torsion spring 88 and the torsion spring similar thereto are configured so that normal flow induced pressure loading on each vane 66 is adapted to work against the stiffness of the torsion springs, thereby forcing the radial inflow nozzle vane 66 to rotate or pivot about a vertical axis that is generally parallel to the vertically-extending center axis 25. The torsion spring 88 and the torsion spring similar thereto, and the bores 66c, are configured so that, when no motive fluid is applied, the radial inflow nozzle vane 66 rotates to its fully closed position. As a result, motive fluid such as air can only flow radially inwardly through the vanes 66. In an exemplary embodiment, the vanes 66 may be positioned relative to one another so that a preload is present to bias the vanes 66 against adjacent ones of the vanes 66, that is, to force the vanes 66 to be closed when no fluid pressure is applied.

In an exemplary embodiment, instead of, or in addition to the elastomeric mounting arrangement shown in FIGS. 8 and 9, each radial outflow nozzle vane 72 is compliantly mounted and thus pivotable about a vertical axis that is generally parallel to the vertically-extending center axis 25 in a manner generally in accordance with the foregoing and shown in FIGS. 10 and 11, that is, with torsion springs, bearing assemblies, and shoulder screws. When no motive fluid is applied, the nozzle vane 72 is in a fully closed position with the tail 72b contacting the head 72a of the adjacent vane 72; as a result, motive fluid such as air can only flow radially outwardly through the vanes 72.

In addition, stop ribs 69 may be disposed radially between the radial inflow nozzle vanes 66 and the radial inflow turbine buckets 58, and are circumferentially spaced about the vertically-extending center axis 25 (FIGS. 1 and 6). Each stop rib 69 extends from the underside 34 of the shroud 17 and to the annular member 36. It will be appreciated that the stop ribs 69 may also be present in the embodiment shown in and described above with reference to FIGS. 1-9. Furthermore, stop ribs (not shown) that are similar to the stop ribs 69 may be disposed radially between the radial outflow nozzle vanes 72 and the radial outflow turbine buckets 60, and may be circumferentially spaced about the vertically-extending center axis 25. Each of these stop ribs extends from the annular base 42 and to the ring 70. In several exemplary embodiments, the vanes 66 pivot to a fully-open position, that is, a position in which the respective tails 66b of the vanes 66 contact respective stop ribs 69 (one of which is shown in FIG. 10) and thus the vanes 66 are prevented from pivoting any further in a clockwise direction, as viewed in FIG. 7. The stop ribs 69 are positioned circumferentially with respect to nozzle vanes 66 such that the center of pressure of the air flow over the nozzle vanes 66 goes through the stop ribs 69. After the vanes 66 make contact with the stop ribs 69, the air flow only applies a direct force against each stop rib 69 and no longer imparts a moment or rotation torque about the pins enclosed by the head 66a to the nozzle vanes 66.

In several exemplary embodiments, instead of, or in addition to the elastomeric mounting arrangement shown in FIGS. 8 and 9 and/or the mechanical mounting arrangement shown in FIGS. 10 and 11, the radial inflow nozzle vanes 66 and/or the radial outflow nozzle vanes 72 may be compliantly mounted and thus pivotable via other mounting arrangements having other structure such as, for example, one pin instead of two pins, three or more pins instead of two pins, springs, pivot bearings, hydraulic dampers, and/or any combination thereof, and/or via active nozzle rotation systems including active valves and/or position sensors and controls, all of which may be at least partially enclosed by the material of the respective heads 66a and 72a for protection from the surrounding environment. In an exemplary embodiment, the radial inflow nozzle vanes 66 and/or the radial outflow nozzle vanes 72 may be composed entirely of a flexible material such as an elastomer. In an exemplary embodiment, the radial inflow nozzle vanes 66 and/or the radial outflow nozzle vanes 72 may be composed entirely of a flexible material such as an elastomer, and the heads 66a and 72a thereof may be rigidly mounted with the tails 66b and 72b thereof being flexible enough to open and/or close. In an exemplary embodiment, the pin 76a extends through a through-bore formed in the head 72a so that the vane 72 is pivotably mounted on the pin 76a, and the pin 76b extends through a through-bore formed in the head 72a that is oversized relative to the pin 76b so that the oversized through-bore provides a pivot stop and thus defines the pivot range of the vane 72.

Figure 12:
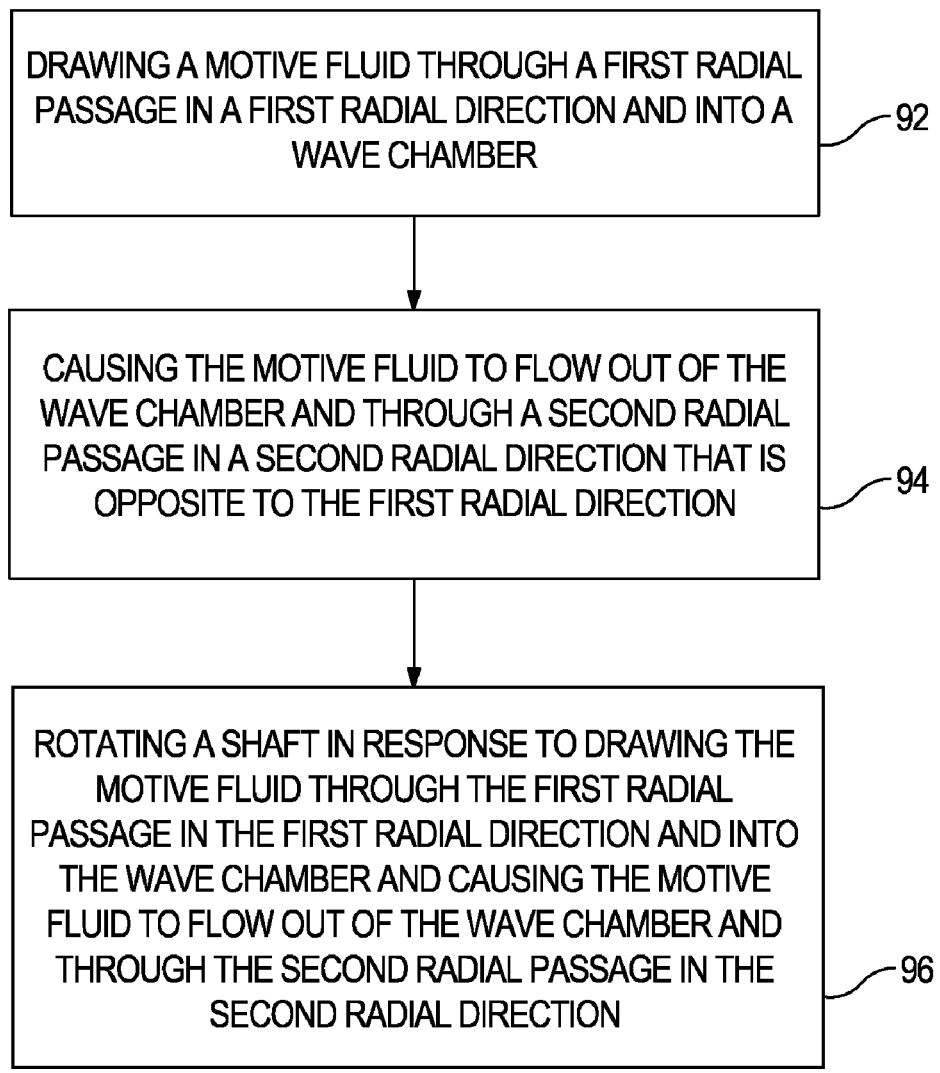
FIG. 12 is a flowchart of a method of rotating a shaft, according to an exemplary embodiment.

In an exemplary embodiment, as illustrated in FIG. 12, a method of rotating a shaft is generally referred to by the reference numeral 90 and includes drawing a motive fluid through a first radial passage in a first radial direction and into a wave chamber, as at 92; causing the motive fluid to flow out of the wave chamber and through a second radial passage in a second radial direction that is opposite to the first radial direction, as at 94; and rotating the shaft in response to drawing the motive fluid through the first radial passage in the first radial direction and into the wave chamber and causing the motive fluid to flow out of the wave chamber and through the second radial passage in the second radial direction, as at 96.

Figure 13:
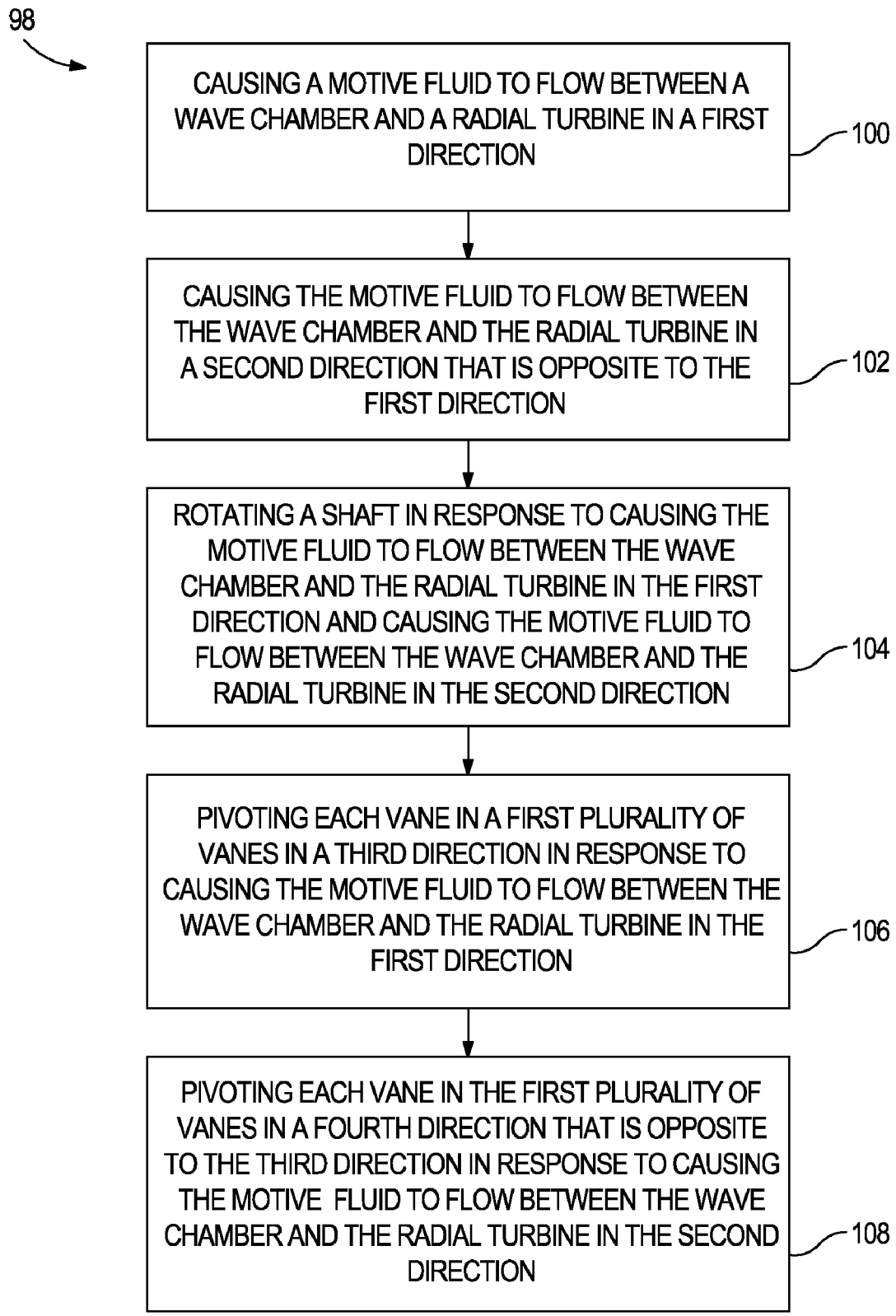
FIG. 13 is a flowchart of another method of rotating a shaft, according to an exemplary embodiment.

In an exemplary embodiment, as illustrated in FIG. 13, a method of rotating a shaft is generally referred to by the reference numeral 98 and includes causing a motive fluid to flow between a wave chamber and a radial flow turbine in a first direction, as at 100; causing the motive fluid to flow between the wave chamber and the radial flow turbine in a second direction that is opposite to the first direction, as at 102; rotating the shaft in response to causing the motive fluid to flow between the wave chamber and the radial flow turbine in the first direction and causing the motive fluid to flow between the wave chamber and the radial flow turbine in the second direction, as at 104; pivoting each vane in a first plurality of vanes in a third direction in response to causing the motive fluid to flow between the wave chamber and the radial flow turbine in the first direction, as at 106; and pivoting each vane in the first plurality of vanes in a fourth direction that is opposite to the third direction in response to causing the motive fluid to flow between the wave chamber and the radial flow turbine in the second direction, as at 108.

Although the present disclosure has described embodiments relating to specific turbomachinery, it is understood that the apparatuses, systems and methods described herein could applied to other environments. For example, according to other exemplary embodiments, instead of, or in addition to wave energy sources, other energy sources may be configured to be used with embodiments of the radial flow turbines described above. For another example, according to other exemplary embodiments, instead of, or in addition to a generator, embodiments of the radial flow turbines described above may be used as drivers for other mechanical devices that require shaft power input such as compressors or pumps. In an exemplary embodiment, an embodiment of the radial flow turbine described above may be positioned above a generator operably coupled thereto, and may include an arrangement of ducts such that the interconnection to the wave chamber is at the outer radial extent of the turbine, with the ambient air connection being a shared passage axially centered at the top of the turbine. In several exemplary embodiments, the shaft driven by an embodiment of the radial flow turbine described above may extend horizontally. In several exemplary embodiments, various horizontal arrangements of the embodiments of the radial flow turbines and generators described above may be implemented in various installations.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An energy conversion system, comprising:
a wave chamber configured to house an oscillating wave column, the oscillating wave column having an upstroke during which the oscillating wave column increases in height and a downstroke during which the oscillating wave column decreases in height;
a turbine wheel having impulse turbine blades and communicating with the wave chamber;
first and second radial flow passages extending radially from the turbine wheel;
first vanes compliantly mounted at least partially in the first radial flow passage, the first vanes being biased toward a closed position and configured to pivot to an open position when impinged by a fluid flowing toward the turbine wheel such that the first vanes block the first radial flow passage during the upstroke and allow fluid to flow through the first radial flow passage during the downstroke; and
second vanes compliantly mounted at least partially in the second radial flow passage, the second vanes being biased toward a closed position and configured to pivot to an open position when impinged by a fluid flowing away from the turbine wheel such that the second vanes block the second radial flow passage during the downstroke and allow fluid to flow through the second radial flow passage during the upstroke.

2. A method for rotating a shaft, comprising:
pivoting first vanes from a first position to a second position to open a first radial flow passage, the first vanes being compliantly mounted in the first radial flow passage;
drawing a motive fluid through the first radial passage in a first radial direction, past a turbine wheel coupled to the shaft, and into a wave chamber;
pivoting the first vanes from the second position to the first position to close the first radial flow passage;
pivoting second vanes from a first position to a second position to open a second radial flow passage, the second vanes being compliantly mounted in the second radial flow passage; and
drawing the motive fluid to flow out of the wave chamber, past the turbine wheel, and through the second radial flow passage in a second radial direction.

3. The method of claim 2, further comprising biasing the first and second vanes toward the first position.

4. The method of claim 3 wherein biasing the first and second vanes comprises using a structure disposed at least partially in a low-modulus material.

5. The method of claim 3, wherein:
pivoting the first vanes to the second position comprises pivoting the first vanes when the second vanes are in the first position; and
pivoting the second vanes to the second position comprises pivoting the second vanes when the first vanes are in the first position.

6. The method of claim 5, wherein pivoting the first and second vanes does not require force beyond what is provided by a minimum flow rate of the motive fluid.

7. An energy conversion system, comprising:
a wave chamber;
a turbine wheel coupled to a shaft and fluidly coupled with the wave chamber;
a first radial flow passage fluidly coupled with the wave chamber and the turbine wheel; and
first vanes disposed at least partially in the first radial flow passage, each of the first vanes being compliantly mounted and pivotal between first and second positions, the first vanes being configured to allow a motive fluid to flow in a first radial direction through the first radial flow passage when the first vanes are in the first position, and the first vanes being configured to substantially prevent the motive fluid from flowing through the first radial flow passage in a second radial direction when the first vanes are in the second position, wherein each of the first vanes is substantially aerofoil shaped and includes a head and a tail extending from the head.

8. The energy conversion system of claim 7, wherein each of the first vanes further comprises a low-modulus material disposed at least in the head.

9. The energy conversion system of claim 8, wherein each of the first vanes further comprises a structure at least partially enclosed by the low-modulus material, the structure of each of the first vanes being configured to pivotally secure the head of each of the first vanes.

10. The energy conversion system of claim 9, wherein the structure of each of the first vanes comprises first and second pins spaced apart from one another so that the tail of each of the first vanes is urged to contact the head of an adjacent one of the first vanes.

11. The energy conversion system of claim 7, wherein each of the first vanes further comprises a biasing member disposed in a bore defined in the head, the biasing member configured to urge the tail of each of the first vanes to contact the head of an adjacent one of the first vanes.

12. The energy conversion system of claim 7, further comprising:
   a second radial flow passage fluidically coupled to the wave chamber and the turbine wheel; and
   second vanes disposed at least partially in the second radial flow passage, the second vanes being compliantly mounted and pivotal between first and second positions, the second vanes configured to allow the motive fluid to flow in the second radial direction through the second radial flow passage when the second vanes are in the first position, and the second vanes configured to substantially prevent the motive fluid from flowing through the second radial flow passage in the first radial direction when the second vanes are in the second position.

13. The energy conversion system of claim 12, wherein the turbine wheel comprises first and second rows of impulse turbine buckets, the first row being aligned with the first radial flow passage and the second row being aligned with the second radial flow passage.

14. An energy conversion system, comprising:
   a wave chamber disposed at least at least partially in a body of water; and
   a radial flow turbine comprising:
      first and second radial flow passages fluidly coupled with the wave chamber;
      a turbine wheel coupled to a shaft and positioned between the wave chamber and the first and second radial flow passages;
      first vanes disposed at least partially in the first radial flow passage, the first vanes being configured to resiliently pivot to allow a motive fluid to enter the first radial flow passage in a first radial direction and to substantially prohibit the motive fluid from flowing out of the first radial flow passage in a second radial direction; and
      second vanes disposed at least partially in the second radial flow passage, the second vanes being configured to resiliently pivot open to allow the motive fluid to flow out of the second radial flow passage in the second radial direction and to pivot closed to substantially prohibit the motive fluid from flowing into the second radial flow passage in the first radial direction, wherein each of the first and second vanes is substantially aerofoil shaped and includes a head and a tail extending from the head.

15. The energy conversion system of claim 14, wherein:
   the head of each of the first and second vanes includes a low-modulus material; and
   each of the first and second vanes further comprises a structure at least partially enclosed by the low-modulus material, the structure being configured to allow each of the first and second vanes to pivot.

16. The energy conversion system of claim 15, wherein the structure comprises first and second pins spaced apart from one another so that the tail is urged to contact the head of an adjacent vane.

17. The energy conversion system of claim 14, wherein each of the first and second vanes further comprises:
   a bore defined in the head; and
   a biasing member disposed in the bore and configured to urge the tail to contact the head of an adjacent one of the first or second vanes.

* * * * *